US011343236B2

(12) United States Patent
Ericksen et al.

(10) Patent No.: US 11,343,236 B2
(45) Date of Patent: May 24, 2022

(54) SYSTEM AND METHOD FOR RENDERING A LANDING PAGE BASED ON LOCATION

(71) Applicant: Charter Communications Operating, LLC, St. Louis, MO (US)

(72) Inventors: Peter Andrew Ericksen, Castle Rock, CO (US); Jon Jasiunas, Castle Rock, CO (US); Donald Sherker, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/936,178

(22) Filed: Jul. 22, 2020

(65) Prior Publication Data

US 2022/0029976 A1    Jan. 27, 2022

(51) Int. Cl.
*H04W 4/00*       (2018.01)
*H04L 29/06*      (2006.01)
*H04L 12/46*      (2006.01)
*H04L 101/622*    (2022.01)
*H04L 67/02*      (2022.01)

(52) U.S. Cl.
CPC .......... *H04L 63/08* (2013.01); *H04L 12/4641* (2013.01); *H04L 61/6022* (2013.01); *H04L 67/02* (2013.01)

(58) Field of Classification Search
CPC ..... H04L 63/08; H04L 67/02; H04L 61/6022; H04L 12/4641
See application file for complete search history.

(56) References Cited

U.S. PATENT DOCUMENTS

| | | | |
|---|---|---|---|
| 8,479,263 B1* | 7/2013 | Liu | H04L 63/0869 726/3 |
| 9,521,606 B1* | 12/2016 | Costa | H04W 12/068 |
| 2005/0059416 A1 | 3/2005 | Ono | |
| 2015/0012970 A1 | 1/2015 | Toksvig et al. | |
| 2015/0201438 A1* | 7/2015 | Adarapu | H04L 67/02 370/328 |
| 2019/0149532 A1* | 5/2019 | Newberg | H04W 12/06 726/5 |
| 2019/0215327 A1* | 7/2019 | Murthy | H04L 63/0236 |

* cited by examiner

*Primary Examiner* — Cheikh T Ndiaye
(74) *Attorney, Agent, or Firm* — The Marbury Law Group, PLLC

(57) ABSTRACT

Systems, methods, and devices for using a Uniform Resource Locator (URL) parameter to pass variables between authentication, authorization, and accounting (AAA) servers and a portal so as to intelligently select and display a different captive portal landing page on a user equipment (UE) device based on any combination of the geographic location of the UE device, the service set identifier (SSID) of the access point, the UE device's media access control (MAC) address.

24 Claims, 6 Drawing Sheets

SYSTEM AND METHOD FOR RENDERING A LANDING PAGE BASED ON LOCATION

BACKGROUND

Wired and wireless communication technologies have seen dramatic improvements over the past several years. Due to these improvements, user equipment (UE) devices, such as smartphone and tablets, have become ubiquitous personal accessories, providing users with access to Internet Protocol (IP) and data services anywhere, at any time. In addition, Internet Service Providers (ISPs) now offer their customers a large number of complex and feature-rich private network services, such as speed caps, service pause and unpause, fine grained parental controls, built-in support for smart appliances, high speed access to devices (e.g., personal computers, printers, TVs, etc.) within the home or local area network, etc.

Moreover, ISPs have been deploying Wi-Fi access points (or "hotspots") that allow their customers to use their UE devices to access private network services in public and semi-public places, such as in parks, shopping malls, coffee shops, etc. Generally, a hotspot is an area or location in which user devices may obtain access to the Internet via a wireless local-area network (WLAN). UE devices may first access an open, public and unencrypted wireless network that is isolated from other local network resources and the Internet. After establishing this connection, the UE device is typically not be able to access to the Internet or local network resources until the UE device is authenticated and/or until the UE device connects to a virtual private network (VPN).

Authentication for a hotspot may be provided via an "Open Auth" method in which all web traffic is forwarded to a captive portal that requests payment and/or authentication in exchange for authorization to access the internet. Captive portals display a landing or log-in webpage that requests authentication, payment, acceptance of an end-user license agreement, acceptable use policy, survey completion, and/or valid credentials from newly connected UE device before the UE device is granted broader access to local network resources and/or to the Internet.

SUMMARY

The various aspects include methods of rendering a landing page on a user equipment device, which may include receiving, via a processor in a server computing device, a resource request that includes one or more parameters from the user equipment device, determining whether the received one or more parameters include a location identifier parameter associated an access point associated with the user equipment device, querying a captive portal database to receive location information in response to determining that the received one or more parameters include the location identifier parameter, and sending the user equipment device a captive portal landing page based on the received location information and a global portal identifier of the access point.

In some aspects, receiving the resource request that includes one or more parameters from the user equipment device may include receiving a hypertext transfer protocol (HTTP) request message from the user equipment device. In some aspects, receiving the resource request that includes one or more parameters from the user equipment device may include receiving a request message that includes at least one or more of the called-station identifier, a basic service set value, a virtual local area network value, a network access server identifier, a network access server internet protocol value, an error value, or an original requested uniform resource locator value. In some aspects, determining whether the received one or more parameters include the location identifier parameter associated an access point associated with the user equipment device may include determining whether the received one or more parameters include a called-station identifier that identifies a media access control (MAC) address of the access point associated with the user equipment device.

In some aspects, sending the user equipment device the captive portal landing page based on the received location information and the global portal identifier of the access point may include sending the user equipment device the captive portal landing page based on the received location information and a virtual local area network (VLAN) parameter of the access point. In some aspects, sending the user equipment device the captive portal landing page based on the received location information and the global portal identifier of the access point may include sending the user equipment device the captive portal landing page based on the received location information and a service set identifier (SSID) of the access point.

Further aspects may include a server computing device having a processor configured with processor-executable instructions to perform various operations corresponding to the methods discussed above. Further aspects may include a non-transitory processor-readable storage medium having stored thereon processor-executable instructions configured to cause a server processor to perform various operations corresponding to the method operations discussed above. Further aspects may include a server computing device having various means for performing functions corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
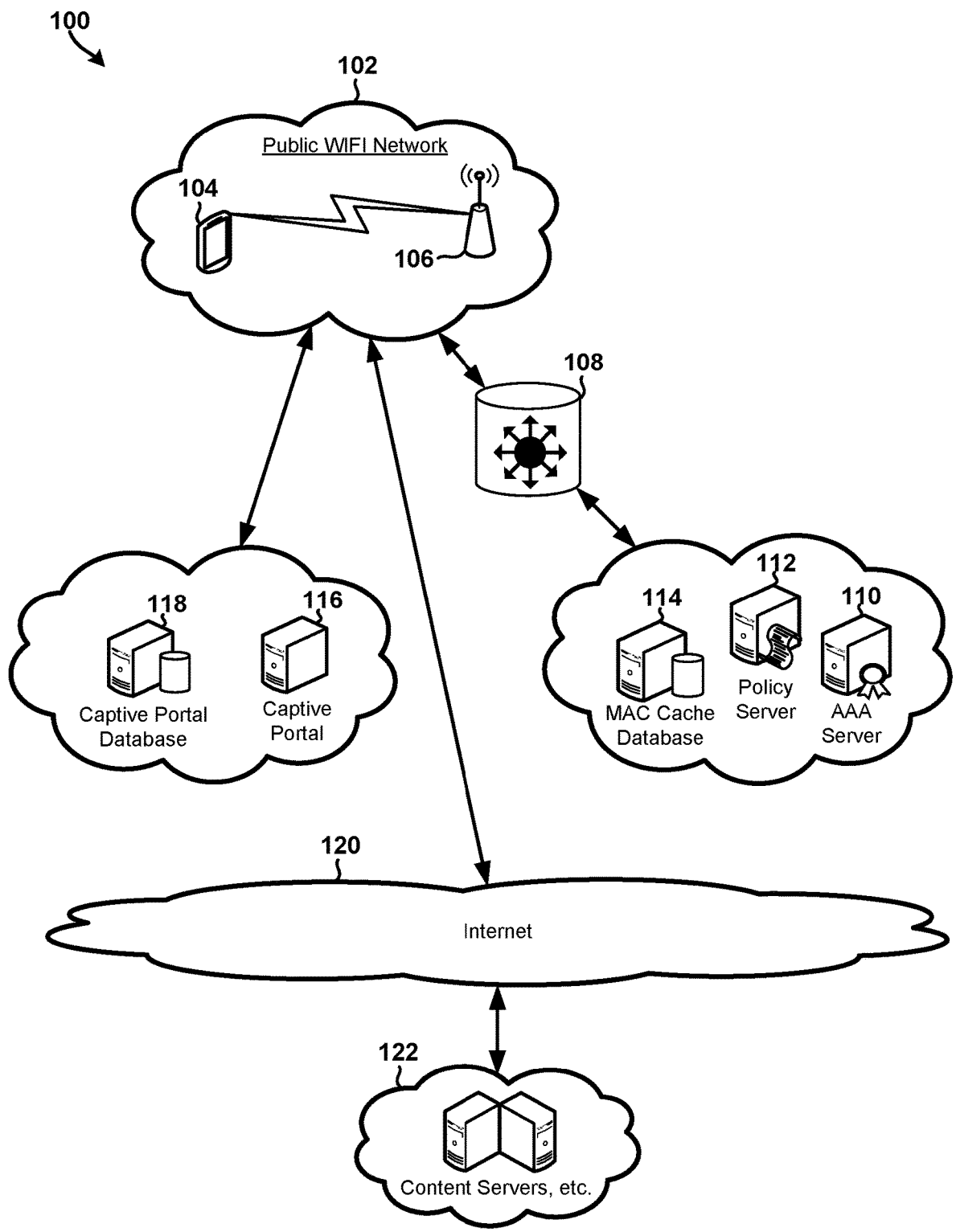
FIG. 1 is a component block diagram of a network suitable for implementing the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "service provider network" is used generically herein to refer to any network suitable for providing users via UE devices with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable users to access communications service providers' services and distribute them around their house via a local area network (LAN), and similar electronic devices which include a programmable processor and memory and circuitry for providing the functionality described herein.

The terms "component," "system," "engine," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The Open Systems Interconnection model (OSI model) characterizes and standardizes the communication functions of a telecommunication or computing network, and supports interoperability of diverse communication systems with standard protocols. The OSI model partitions a communication system into layers, namely a physical layer, a data link layer, a network layer, a transport layer, a session layer, a presentation layer, and an application layer. The physical layer, or layer 1, is responsible for the transmission and reception of unstructured raw data between a device and a physical transmission medium, and converts the digital bits into electrical, radio, or optical signals. The data link layer, or layer-2, is the protocol layer that transfers data between adjacent network nodes in a wide area network (WAN) or between nodes on the same local area network (LAN) segment. The network layer, or layer-3, is responsible for packet forwarding including routing through intermediate routers.

Generally, a virtual private network (VPN) extends a private network across a public network, and enables users to send and receive data across shared or public networks as if their computing devices were directly connected to the private network. A VPN may be created by establishing a virtual point-to-point connection through the use of dedicated circuits or with tunneling protocols over existing networks.

Wi-Fi access points (hotspots) are now widely deployed in various public venues such as airports, train stations, sports arenas, shopping malls, conference centers, restaurants, coffee shops, etc. In many cases, such venues may be served by more than one Wi-Fi network provider and intelligently selecting among the available Wi-Fi networks is important for a good customer experience as well as for the operator's business model. Cable operators are using Wi-Fi networks to offer their customers access to online applications and Internet services while outside the home or office. Residential broadband gateways from some cable operators may also support both private and public hotspots, allowing authenticated subscribers to connect seamlessly to the advertised public hotspot when outside their home. Some cable operators are also engaged in "roaming partnership" agreements (e.g., Cable WiFi in the US, etc.), which enable their customers to gain access to the partner's Wi-Fi network when travelling outside their home service area.

Typically, a user logging onto a public Wi-Fi hotspot will be directed to a default landing page. The landing page may provide the user with disclaimers regarding privacy, limitations of data usage, etc. Users may be unfamiliar with such landing pages and be dissuaded from longing onto the public Wi-Fi hotspot due to the unfamiliarity or restrictions placed on the user. As the number of hotspots and user options continue to grow, it is becoming increasingly important for a UE device to be able control the captive portal landing pages that are rendered on the UE device in order to present the user with a consistent "look and feel," filter through all the available hotspots, and simplify the authentication process.

The embodiments include components (e.g., a server computing device, etc.) configured to allow a UE device to intelligently select and render a captive portal landing page on the UE device. For example, some embodiments may include a server computing device that is configured to determine whether a resource request received from a UE device includes a called station identifier parameter (e.g., Called-Station-ID, etc.) that identifies a media access control (MAC) address of an access point (AP) associated with the UE device. In response to determining that the received resource request includes the called station identifier parameter, the server computing device may query a captive portal database for location information (e.g., a location-specific portal identifier, etc.). The server computing device may select a captive portal landing page based on the query results (e.g., the received location information, etc.) and a global portal identifier (e.g., a VLAN parameter, SSID, etc.), and send the selected captive portal landing page to the UE device. As such, the server computing device may control the captive portal landing pages that are rendered on the UE device in order to present the user with a consistent "look and feel," filter through all the available hotspots, and simplify the authentication process.

FIG. 1 illustrates various components and communication links in an example network 100 that may be configured to pass variables between authentication, authorization, and accounting (AAA) servers and a portal so as to intelligently select and display a different captive portal landing page on a user equipment (UE) device in accordance with some embodiments. In the example illustrated in FIG. 1, the network 100 includes a public WiFi network 102, one or more UE 104 devices connected to a wireless access point 106 via wireless communication links, a gateway 108 component, an AAA server 110, and a policy server 112, a media access control (MAC) cache database 114 component, a captive portal 116 component, and a captive portal database 118 component.

The wireless access point 106 may broadcast a public service set identifier (SSID) that allows the UE 104 devices to identify and connect to the public WiFi network 102, and to ultimately access the Internet 120, to receive information from remote content servers 122, and/or to receive other network services.

The gateway 108 may logically terminate the public WiFi network 102, serve as the entry point for the public UEs 104 attached to the public WiFi network 102, and deliver network traffic and communications from the UEs 104 to network components. In some embodiments, the gateway 108 may have visibility into the MAC addresses of the devices (e.g., UEs 104, wireless access point 106, etc.) included in the network and/or which are otherwise connected to receive network services. In some embodiments, the gateway 108 may be configured to receive an HTTP request message (e.g., GET, POST, PUT, etc.) from a UE 104 device (i.e., via the wireless access point 106) and determine whether the UE 104 device is associated with an active session. If the UE device is not associated with an active session, the gateway 108 may generate and send an access-request message that includes a MAC address of the UE 104 device to the AAA server 110 in order to determine whether the UE 104 device should be granted access to the network. For example, the UE MAC address may be used for identification and authentication. In some embodiments, the AP MAC, SSID, or similar information may also be provided and used for additional logic.

The AAA server 110 may be configured to authenticate access-requests, pull appropriate subscriber policies from the policy server 112, interpret policy responses, and return an appropriate policy. For example, the AAA server 110 may receive the access-request message, query the policy server 112 and/or other servers in the service provider network to receive the appropriate policy (or charging, subscriber, etc.) information, use the received information to determine whether the UE 102 should be granted access to a requested service, and to generate and send an access-response message that includes policy and/or AAA information to the appropriate network component (e.g., gateway 108 component). In some embodiments, the AAA server 110 may be configured to query the MAC cache database 114 for a MAC address included in the access-request to determine whether the MAC address was previously used for authentication.

The policy server 112 may be a policy management system that is responsible for identifying or determining various subscriber policies, such as policy rules that control the bandwidth, the quality of service (QoS), and other characteristics of the network connections and communications of UE 104 devices. The policy server 112 may receive a request message (e.g., a request for attaching a subscriber session associated with UE 104 device, etc.) from the AAA server 110, use the information included in the received request message to identify the policy information/parameters that are relevant to a subscriber or UE 104 device, generate a response message that includes the identified policy information/parameters, and send the generated response message to the AAA server 110.

The MAC cache database 114 component may store MAC addresses used during authentication and/or any number of parameters that are suitable for use in authentication or for implementing additional logic depending on configuration. The MAC cache database 114 component may be configured to receive and respond to query requests from the AAA server 110.

The captive portal 116 component may be configured to receive a HTTP request message (e.g., HTTP Get message, etc.) from a UE 104 device, parse parameters included in the received request message, query the captive portal database 118 component to retrieve location settings, select a captive portal landing page based on the parsed parameters and/or location settings, and send the selected captive portal landing page to the UE 104 device.

The captive portal database 118 component may be configured to store configuration information, including value location settings. Such information may be used by the captive portal 116 component to determine the location of the UE 104 device, as well as which portal should be displayed, based on the parameters contained in a redirect URL (which may be used to redirect the user device to captive portal server with specific parameters as part of the operations in block 406 discussed below).

Figure 2:
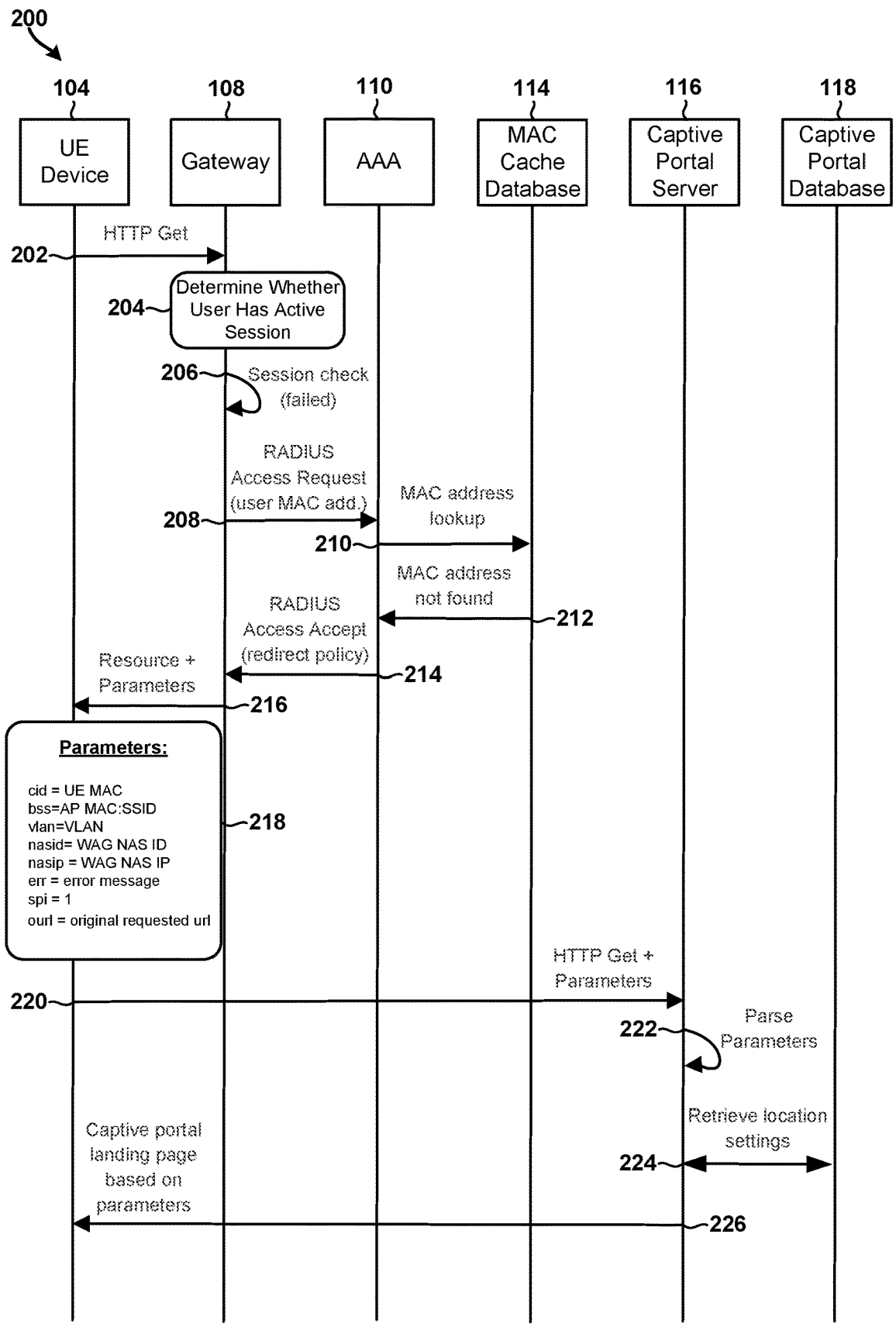
FIG. 2 is call flow diagram illustrating operations and interactions between the components in a network configured to intelligently select for display a captive portal landing page based on the geographic location of the UE device and the service set identifier (SSID) of the access point in accordance with some embodiments.

FIG. 2 illustrates operations and interactions between the components in a network configured to perform a method 200 for intelligently selecting and displaying a captive portal landing page on a UE 104 device in accordance with some embodiments. In operation 202, the UE 104 device may send (e.g., via a wireless access point 106, etc.) a request message (e.g., HTTP request message, HTTP Get message, etc.) to the gateway 108 component.

In operation block 204, in response to the gateway 108 receiving the request message, the gateway 108 may determine whether the UE 104 device is associated with an active session. In operation 206, the gateway 108 may determine that the UE 104 device is not associated with an active session. In operation 208, the gateway 108 may generate and send an access request message that includes the MAC address of the UE 104 device to the AAA server 110.

In operation 210, in response to receiving the access request message from the gateway 108 that includes the MAC address of the UE 104 device, the AAA server 110 may query the MAC cache database 114 for a MAC address included in the access-request to determine whether the MAC address was previously used for authentication.

In operation 212, the MAC cache database 114 may generate and send to the AAA server 110 a query response that indicates that the MAC address was not previously used for authentication.

In operation 214, the AAA server 110 may generate and send to the gateway 108 an access response message that includes a redirect policy.

In operation 216, the gateway 108 may select parameters/value based on the redirect policy, send an internet resource (e.g., URL) with the selected parameters/values to the UE device. Example parameters/values include a called-station identifier (CID or Called-Station-ID), a basic service set (BSS), virtual local area network (VLAN), network access server identifier (nasid), network access server internet protocol (NASIP), error (ERR), system packet interface (SPI), and the original requested URL (OURL).

In operation block 218, the UE 104 device may receive the resource (e.g., URL) and parameters/values and generate a request message (e.g., HTTP Get message, etc.) that includes one or more of the parameters/values. In operation 220, the UE 104 device may send the request message (e.g., HTTP request) with the parameters/values to the captive portal 116.

In operation 222, the captive portal 116 may parse the parameters/values. For example, the captive portal 116 may parse URL parameters and apply any decryption and/or decoding that may be necessary in operation 222. In operation 224, the captive portal 116 may use the information included in the received request message to query the captive portal database 118 and retrieve location settings from the captive portal database 118. For example, the captive portal 116 may use parameters in the lookup/query to determine whether the UE 104 device should be provided a global portal or a location-specific portal, and may retrieve and load a portal landing page from the captive portal database 118 or other location. In operation 224 and/or 226, the captive portal 116 may select a captive portal landing page based on the parsed parameters and/or location settings, configure a web application response that permits the UE 104 device to authenticate with the Wi-Fi network, and send the selected captive portal landing page and/or web application response to the UE 104 device. For example, in some embodiments, in operation 226, the captive portal 116 may apply the relevant landing page configuration and send the landing page to the UE 104 device in an HTTP response message (e.g., in response to the HTTP request received in operation 220, etc.).

Figure 3:
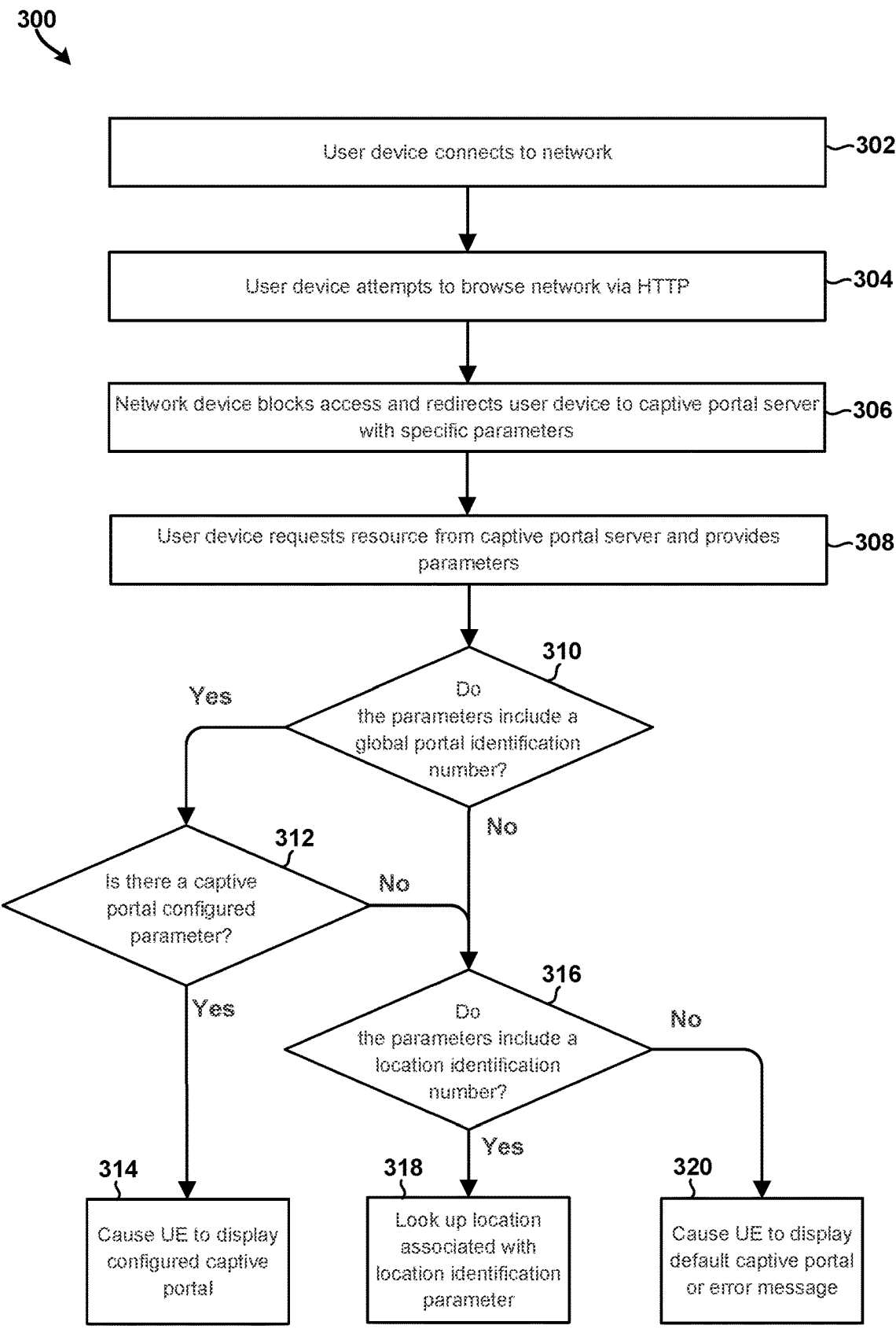
FIGS. 3 and 4 are a process flow diagram illustrating a method for intelligently selecting and displaying a captive portal landing page on a UE device in accordance with some embodiments.
Figure 4:
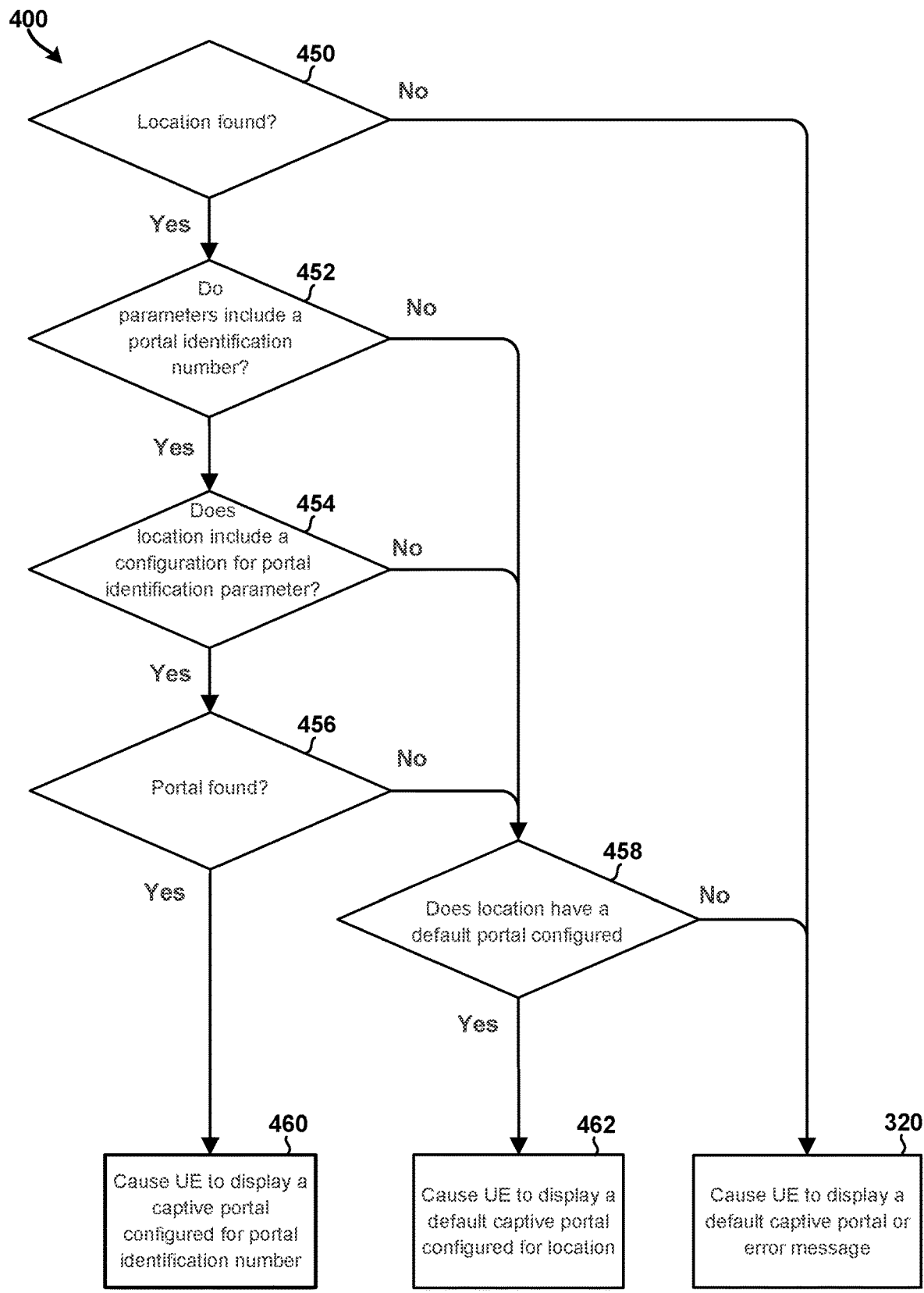

FIGS. 3 and 4 illustrate methods 300, 400 for intelligently selecting and displaying a captive portal landing page on a UE device in accordance with some embodiments. Methods 300 and 400 may be performed by a processor in a computing system (e.g., user equipment device, network server, etc.) that includes or implements all or portions of any or all of the network components (e.g., captive portal, etc.) discussed in this application.

With reference to FIG. 3, in block 302, a user device may establish a connection or communication link to a network. In block 304, the user device may attempt to browse the network via HTTP. In block 306, a network device may block the user device's access to the network and redirect the user device to captive portal server with specific parameters. In block 308, the user device may request a resource from a captive portal server and provide the captive portal server with select parameters.

In determination block 310, the captive portal server may receive the resource request from the user device and determine whether the parameters include a global portal identification number. In response to determining that the parameters include a global portal identification number (i.e., determination block 310="Yes"), the captive portal server may determine whether there is a captive portal configured parameter in determination block 312.

In response to determining that there is a captive portal configured parameter in the resource request (i.e., determination block 312="Yes"), the captive portal server may cause the user device to display a configured captive portal in block 314.

In response to determining that the parameters do not include a global portal identification number (i.e., determination block 310="No") or in response to determining that there is no captive portal configured parameter in the resource request (i.e., determination block 312="No"), the captive portal server may determine whether the parameters include a location identification number in determination block 316. In response to determining that the parameters do not include a location identification number (i.e., determination block 316="No"), the captive portal server may cause the user device to display a default captive portal or an error message in block 320.

In response to determining that the parameters include a location identification number (i.e., determination block 316="Yes"), the captive portal server may look up the location associated with location identification parameter in block 318. With reference to FIG. 4, in determination block 450, the captive portal server may determine whether the location associated with location identification parameter was successfully identified (e.g., as a result of the look up operation in block 318). In response to determining that the location associated with location identification parameter was not identified (i.e., determination block 450="No"), the captive portal server may cause the user device to display a default captive portal or an error message in block 320.

In response to determining that the location associated with location identification parameter was successfully identified (i.e., determination block 450="Yes"), the captive portal server may determine whether the parameters include a portal identification number in determination block 452, whether the location includes a configuration for portal identification parameter in determination block 454, and/or whether the portal was found in determination block 456. In particular, in response to determining that the parameters include a portal identification number (i.e., determination block 452="Yes"), the captive portal server may determine whether the location includes a configuration for portal identification parameter in determination block 454. In response to determining that the location includes a configuration for portal identification parameter (i.e., determination block 454="Yes"), the captive portal server may determine whether the portal was found in determination block 456. In response to determining that the portal was found (i.e., determination block 454="Yes"), the captive portal server may cause the user device to display a captive portal configured for the portal identification number in block 460.

In response to determining that the parameters do include a portal identification number (i.e., determination block 452="No"), that the location does not include a configuration for portal identification parameter (i.e., determination block 454="No"), or that the portal was found (i.e., determination block 456="No"), the captive portal server may determine whether the location has a default portal configured in determination block 458. In response to determining that the location has a default portal configured (i.e., determination block 458="Yes"), the captive portal server may cause the user device to display a default captive portal configured for the location in block 462. In response to determining that the location does not have a default portal configured (i.e., determination block 458="No"), the captive portal server may cause the user device to display a default captive portal or an error message in block 320.

Figure 5:
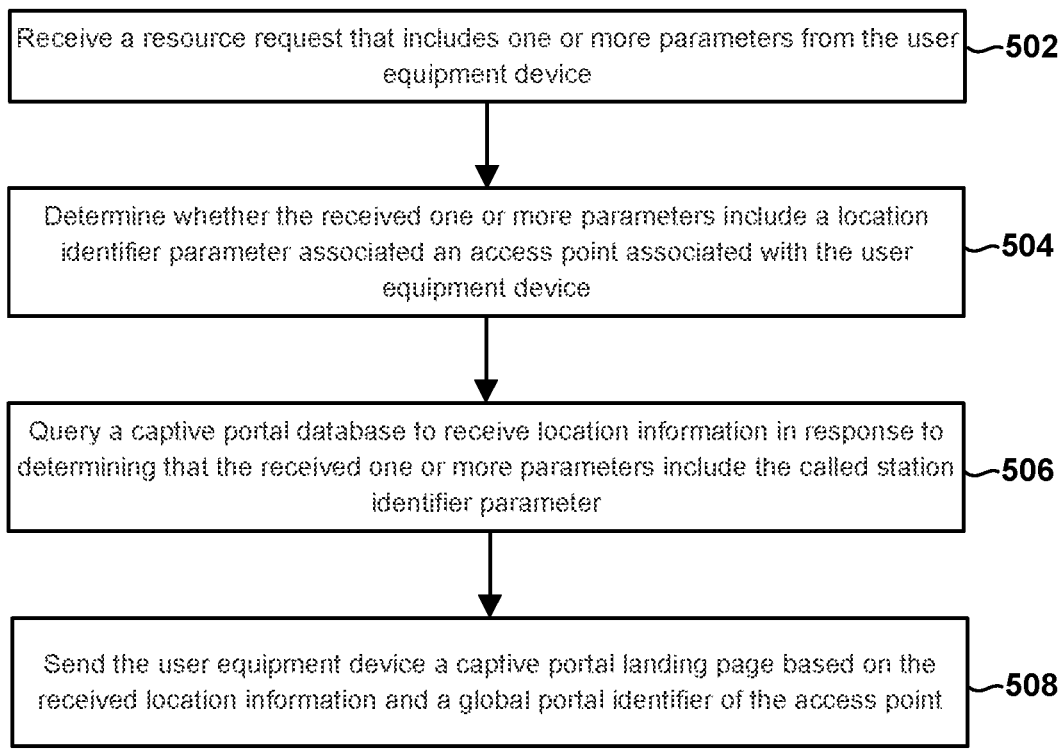
FIG. 5 is a process flow diagram illustrating a method for rendering a captive portal landing page on a user equipment device in accordance with some embodiments.

FIG. 5 illustrates a method 500 of rendering a captive portal landing page on a user equipment device in accordance with the embodiments. Method 500 may be performed by a processor in a server computing device (e.g., captive portal server, etc.). In block 502, the server computing device may receive a resource request that includes one or more parameters from the user equipment device. For example, the server computing device may receive a HTTP request message that includes parameters from the user equipment device in block 502. Example parameters that could be included in the HTTP request message include a called-station identifier, a basic service set value, a virtual local area network value, a network access server identifier, a network access server internet protocol value, an error value, an original requested uniform resource locator value, global portal identification number, location identification number, portal identification number, etc.

In block 504, the server computing device may determine whether the received one or more parameters include a location identifier parameter, which may be associated an access point associated with the user equipment device. For example, in block 504, the server computing device may determine whether the received one or more parameters include a called-station identifier that identifies a media access control (MAC) address of the access point associated with the user equipment device. In block 506, the server computing device may query a captive portal database to receive location information in response to determining that the received one or more parameters include a location identifier parameter (e.g., a called-station identifier). In block 508, the server computing device may send the user equipment device the captive portal landing page based on the received location information and the global portal identifier of the access point. For example, in block 506, the server computing device may send the user equipment device the captive portal landing page based on the received location information and a virtual local area network (VLAN) parameter or SSID of the access point.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 200 and 300 may be substituted for or combined with one or more operations of the methods 200 and 300 and vice versa.

Figure 6:
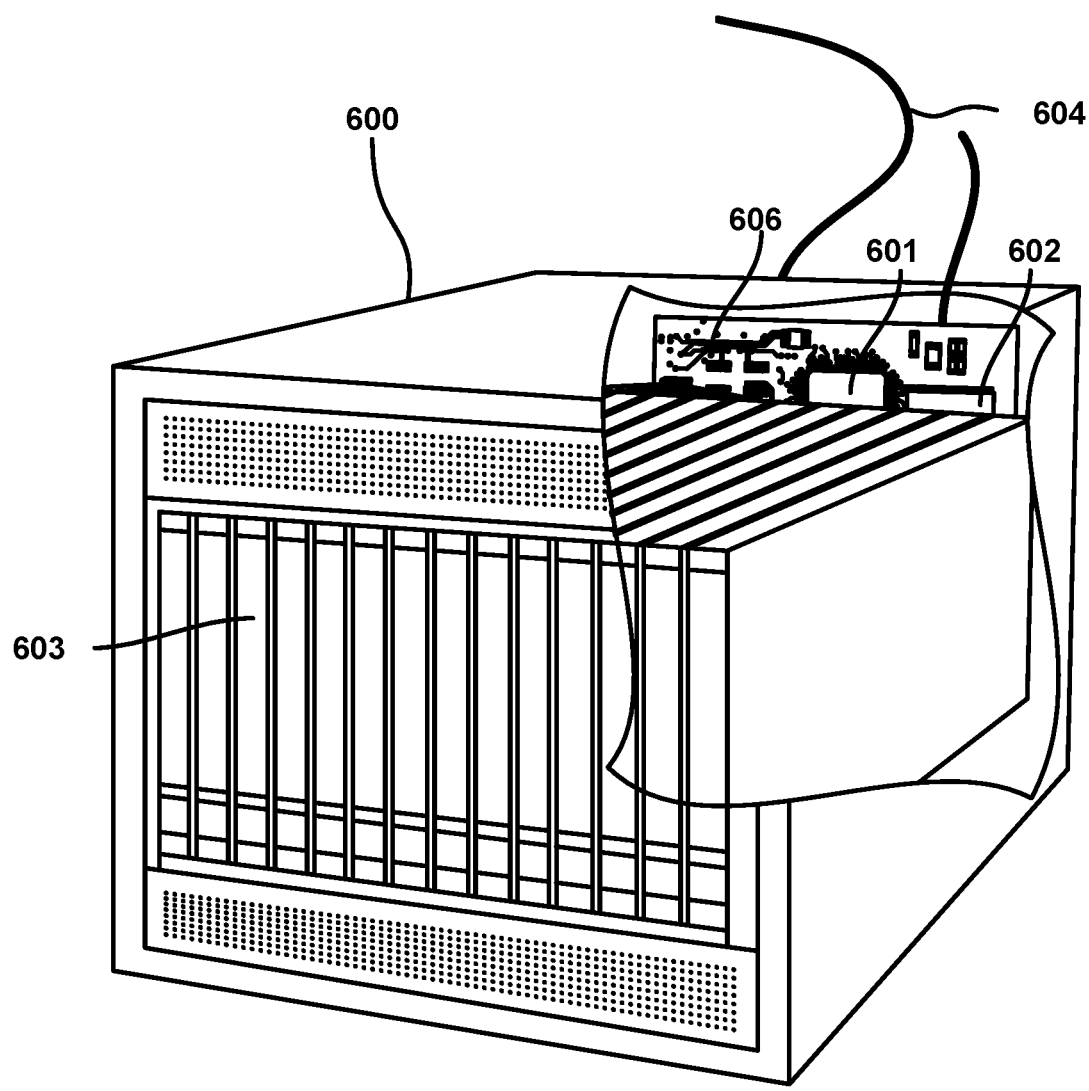
FIG. 6 is a component diagram of an example server suitable for implementing the various embodiments.

Various embodiments (including, but not limited to, embodiments discussed above with reference to FIGS. 1 through 5) may be implemented on any of a variety of commercially available computing devices, such as the server computing device 600 illustrated in FIG. 6. Such a server device 600 may include a processor 601 coupled to volatile memory 602 and a large capacity nonvolatile memory, such as a disk drive 603. The server device 600 may also include a floppy disc drive, USB, compact disc (CD) or DVD disc drive coupled to the processor 601. The server device 600 may also include network access ports 606 coupled to the processor 601 for establishing data connections with a network connection circuit 604 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of rendering a landing page on a user equipment device, comprising:
   receiving, via a processor in a server computing device, a resource request that includes one or more parameters from the user equipment device;
   determining, by the processor, whether the received one or more parameters include a location identifier parameter associated with an access point associated with the user equipment device;
   querying, by the processor, a captive portal database to receive query results that include location information in response to determining that the received one or more parameters include the location identifier parameter;
   selecting, by the processor, a captive portal landing page based on the received query results and a global portal identifier of the access point; and
   sending, by the processor, the selected captive portal landing page to the user equipment device.

2. The method of claim 1, wherein receiving the resource request that includes the one or more parameters from the user equipment device comprises receiving a hypertext transfer protocol (HTTP) request message from the user equipment device.

3. The method of claim 1, wherein receiving the resource request that includes the one or more parameters from the user equipment device comprises receiving a request message that includes at least one or more of a called-station identifier, a basic service set value, a virtual local area network value, a network access server identifier, a network access server internet protocol value, an error value, or an original requested uniform resource locator value.

4. The method of claim 1, wherein determining whether the received one or more parameters include the location identifier parameter associated with an access point associated with the user equipment device comprises determining whether the received one or more parameters include a called-station identifier that identifies a media access control (MAC) address of the access point associated with the user equipment device.

5. The method of claim 1, wherein selecting the captive portal landing page based on the received query results and the global portal identifier of the access point comprises selecting the captive portal landing page based on the received query results and a virtual local area network (VLAN) parameter of the access point.

6. The method of claim 1, wherein selecting the captive portal landing page based on the received query results and the global portal identifier of the access point comprises selecting the captive portal landing page based on the received query results and a service set identifier (SSID) of the access point.

7. A server computing device, comprising:
   a processor configured with processor-executable software instructions to:
   receive a resource request that includes one or more parameters from a user equipment device;
   determine whether the received one or more parameters include a location identifier parameter associated with an access point associated with the user equipment device;
   query a captive portal database to receive query results that include location information in response to determining that the received one or more parameters include the location identifier parameter;

select a captive portal landing page based on the received query results and a global portal identifier of the access point; and send the selected captive portal landing page to the user equipment device.

8. The server computing device of claim 7, wherein the processor is configured with processor-executable software instructions to receive the resource request that includes the one or more parameters from the user equipment device by receiving a hypertext transfer protocol (HTTP) request message from the user equipment device.

9. The server computing device of claim 7, wherein the processor is configured with processor-executable software instructions to receive the resource request that includes the one or more parameters from the user equipment device by receiving a request message that includes at least one or more of a called-station identifier, a basic service set value, a virtual local area network value, a network access server identifier, a network access server internet protocol value, an error value, or an original requested uniform resource locator value.

10. The server computing device of claim 7, wherein the processor is configured with processor-executable software instructions to determine whether the received one or more parameters include the location identifier parameter associated with an access point associated with the user equipment device by determining whether the received one or more parameters include a called-station identifier that identifies a media access control (MAC) address of the access point associated with the user equipment device.

11. The server computing device of claim 7, wherein the processor is configured with processor-executable software instructions to select the captive portal landing page based on the received query results and the global portal identifier of the access point by selecting the captive portal landing page based on the received query results and a virtual local area network (VLAN) parameter of the access point.

12. The server computing device of claim 7, wherein the processor is configured with processor-executable software instructions to select the captive portal landing page based on the received query results and the global portal identifier of the access point by selecting the captive portal landing page based on the received query results and a service set identifier (SSID) of the access point.

13. A non-transitory computer readable storage medium having stored thereon processor-executable software instructions configured to cause a server processor to perform operations for rendering a landing page on a user equipment device, the operations comprising:
receiving a resource request that includes one or more parameters from the user equipment device;
determining whether the received one or more parameters include a location identifier parameter associated with an access point associated with the user equipment device;
querying a captive portal database to receive query results that include location information in response to determining that the received one or more parameters include the location identifier parameter;
selecting a captive portal landing page based on the received query results and a global portal identifier of the access point; and
sending the selected captive portal landing page to the user equipment device.

14. The non-transitory computer readable storage medium of claim 13, wherein the stored processor-executable software instructions are configured to cause the server processor to perform operations such that receiving the resource request that includes the one or more parameters from the user equipment device comprises receiving a hypertext transfer protocol (HTTP) request message from the user equipment device.

15. The non-transitory computer readable storage medium of claim 13, wherein the stored processor-executable software instructions are configured to cause the server processor to perform operations such that receiving the resource request that includes the one or more parameters from the user equipment device comprises receiving a request message that includes at least one or more of a called-station identifier, a basic service set value, a virtual local area network value, a network access server identifier, a network access server internet protocol value, an error value, or an original requested uniform resource locator value.

16. The non-transitory computer readable storage medium of claim 13, wherein the stored processor-executable software instructions are configured to cause the server processor to perform operations such that determining whether the received one or more parameters include the location identifier parameter associated with an access point associated with the user equipment device comprises determining whether the received one or more parameters include a called-station identifier that identifies a media access control (MAC) address of the access point associated with the user equipment device.

17. The non-transitory computer readable storage medium of claim 13, wherein the stored processor-executable software instructions are configured to cause the server processor to perform operations such that selecting the captive portal landing page based on the received query results and the global portal identifier of the access point comprises selecting the captive portal landing page based on the received query results and a virtual local area network (VLAN) parameter of the access point.

18. The non-transitory computer readable storage medium of claim 13, wherein the stored processor-executable software instructions are configured to cause the server processor to perform operations such that selecting the captive portal landing page based on the received query results and the global portal identifier of the access point comprises selecting the captive portal landing page based on the received query results and a service set identifier (SSID) of the access point.

19. A server computing device, comprising:
means for receiving a resource request that includes one or more parameters from a user equipment device;
means for determining whether the received one or more parameters include a location identifier parameter associated with an access point associated with the user equipment device;
means for querying a captive portal database to receive query results that include location information in response to determining that the received one or more parameters include the location identifier parameter;
means for selecting a captive portal landing page based on the received query results and a global portal identifier of the access point; and
means for sending the selected captive portal landing page to the user equipment device.

20. The server computing device of claim 19, wherein means for receiving the resource request that includes the one or more parameters from the user equipment device comprises means for receiving a hypertext transfer protocol (HTTP) request message from the user equipment device.

21. The server computing device of claim 19, wherein means for receiving the resource request that includes the one or more parameters from the user equipment device comprises means for receiving a request message that includes at least one or more of a called-station identifier, a basic service set value, a virtual local area network value, a network access server identifier, a network access server internet protocol value, an error value, or an original requested uniform resource locator value.

22. The server computing device of claim 19, wherein means for determining whether the received one or more parameters include the location identifier parameter associated with an access point associated with the user equipment device comprises means for determining whether the received one or more parameters include a called-station identifier that identifies a media access control (MAC) address of the access point associated with the user equipment device.

23. The server computing device of claim 19, wherein means for selecting the captive portal landing page based on the received query results and the global portal identifier of the access point comprises means for selecting the captive portal landing page based on the received query results and a virtual local area network (VLAN) parameter of the access point.

24. The server computing device of claim 19, wherein means for selecting the captive portal landing page based on the received query results and the global portal identifier of the access point comprises means for selecting the captive portal landing page based on the received query results and a service set identifier (SSID) of the access point.

* * * * *